United States Patent
Grodzki (10) Patent No.: US 12,449,497 B2
(45) Date of Patent: Oct. 21, 2025

(54) METHOD FOR CREATING AN IMAGE DATASET, MAGNETIC RESONANCE SYSTEM, COMPUTER PROGRAM PRODUCT AND ELECTRONICALLY READABLE DATA CARRIER

(71) Applicant: Siemens Healthineers AG, Forchheim (DE)

(72) Inventor: David Grodzki, Erlangen (DE)

(73) Assignee: Siemens Healthineers AG, Forchheim (DE)

(*) Notice: Subject to any disclaimer, the term of this patent is extended or adjusted under 35 U.S.C. 154(b) by 141 days.

(21) Appl. No.: 18/519,155

(22) Filed: Nov. 27, 2023

(65) Prior Publication Data
US 2024/0175956 A1 May 30, 2024

(30) Foreign Application Priority Data
Nov. 30, 2022 (DE) ............ 10 2022 212 912.1

(51) Int. Cl.
*G01R 33/561* (2006.01)
*G01R 33/56* (2006.01)

(52) U.S. Cl.
CPC ..... *G01R 33/5615* (2013.01); *G01R 33/5608* (2013.01)

(58) Field of Classification Search
None
See application file for complete search history.

(56) References Cited

U.S. PATENT DOCUMENTS

| 2012/0074938 A1 | 3/2012 | Grodzki et al. |
| 2014/0077809 A1 | 3/2014 | Schmidt |
| 2016/0047874 A1 | 2/2016 | Grodzki et al. |

FOREIGN PATENT DOCUMENTS

| DE | 102010041446 A1 | 3/2012 | |
| DE | 102010041450 B4 * | 11/2012 | ......... G01R 33/4828 |
| DE | 102010041448 B4 * | 1/2013 | ......... G01R 33/4828 |
| DE | 102012216711 A1 | 2/2014 | |
| DE | 102014215954 A1 | 2/2016 | |

* cited by examiner

*Primary Examiner* — Rodney E Fuller
(74) *Attorney, Agent, or Firm* — Banner & Witcoff Ltd.

(57) ABSTRACT

In a method for creating an image dataset of a mapping area situated in a measuring volume, k-space corresponding to the mapping area may be read out and image data may be reconstructed based on recorded first and second raw data points of k-space. The reading out of k-space may include: switching a gradient in the slice selection direction and a phase-encoding gradient in at least one further encoding direction, radiating a non-slice-selective radio-frequency (RF) excitation pulse, recording echo signals and storing them as first raw data points along a radial k-space trajectory predefined by the full strength of the phase-encoding gradients (Gp) further switched during recording of the echo signals, and reading out k-space corresponding to the mapping area as second raw data points.

18 Claims, 6 Drawing Sheets

METHOD FOR CREATING AN IMAGE DATASET, MAGNETIC RESONANCE SYSTEM, COMPUTER PROGRAM PRODUCT AND ELECTRONICALLY READABLE DATA CARRIER

CROSS REFERENCE TO RELATED APPLICATIONS

This patent application claims priority to German Patent Application No. 10 2022 212 912.1, filed Nov. 30, 2022, which is incorporated herein by reference in its entirety.

BACKGROUND

Field

The present disclosure relates to a method in order to create an image dataset by means of a magnetic resonance system. Furthermore, the present disclosure relates to a correspondingly embodied magnetic resonance system and to a corresponding computer program product and an electronically readable data carrier.

Related Art

Magnetic resonance technology (hereinafter the abbreviation MR stands for magnetic resonance) is a known technology with which images of the inside of an examination object can be created. Simply put, for this purpose the examination object is positioned in a magnetic resonance device in a comparatively strong static, homogeneous basic magnetic field, also called $B_0$ field, with field strengths of 0.2 tesla to 7 tesla and above, so its nuclear spins are oriented along the basic magnetic field. In order to trigger nuclear spin resonances which can be measured as signals, radio-frequency excitation pulses (radio frequency, RF pulses) are radiated into the examination object, the triggered nuclear spin resonances are measured as what is known as k-space data and MR images are reconstructed or spectroscopy data is ascertained on the basis thereof. For spatial encoding of the measurement data, fast-switched magnetic gradient fields, called gradients for short, are overlaid on the basic magnetic field. One pattern used, which describes a sequence over time of RF pulses to be radiated and gradients to be switched, is referred to as a pulse sequence (pattern), or also as a sequence for short. The recorded measurement data is digitized and saved in a k-space matrix as complex numerical values. An associated MR image can be reconstructed from the k-space matrix occupied by values, for example by means of a multi-dimensional Fourier transform.

New fields of application in magnetic resonance tomography are provided by the capture of MR data with very short echo times TE (for example TE<500 μs). As a result, it is possible to represent substances or tissue, which cannot be represented by means of conventional sequences, such as a (T)SE sequence ("(Turbo) Spin Echo") or a GRE sequence ("gradient echo"), since their T2 time, the relaxation of the transverse magnetization of this substance or tissue, is much shorter than the echo time is and thus a corresponding signal from these substances or tissues has already decayed at the recording instant. With echo times which lie in the region of the corresponding decay time, it is possible, for example, to represent bones, tendons, ligaments, teeth or ice in an MR image even though the T2 time of these objects lies in a range from 30-80 μs.

Conventional techniques include sequences which enable a very short echo time. One example is the radial UTE sequence ("Ultrashort Echo Time"), as is described, for example, in the article by Sonia Nielles-Vallespin "3D radial projection technique with ultrashort echo times for sodium MRI: Clinical applications in human brain and skeletal muscle", Magn. Res. Med. 2007; 57; pp. 74-81. With this sequence type, after a delay T_delay after a non- or slice-selective excitation, the gradient is powered up and data acquisition is begun at the same time. The k-space trajectory sampled in this way after an excitation runs radially outwards from the k-space center. Therefore, before the reconstruction of the image data from the raw data recorded in the k-space by means of Fourier transform, this raw data has to firstly be converted, for example by regridding, to a Cartesian k-space grid.

A further approach for enabling short echo times is to sample the k-space in a point-like manner by capturing the Free Induction Decay (FID). A method of this kind is also referred to as single point imaging since substantially only one raw data point is captured in the K-space per RF excitation. One example of such a method of single point imaging is the RASP method ("Rapid Signals Point (RASP) Imaging", O. Heid, M. Deimling, SMR, 3rd Annual Meeting, page 684, 1995). According to the RASP method, a raw data point is read out in the k-space at a fixed instant after the RF excitation at the "echo time" TE, the phase of which was encoded by gradients. The gradients are changed by means of the magnetic resonance system for each raw data point or measurement point and the k-space thus sampled point for point, as is represented in FIGS. 1a and 1b.

Further methods with short echo times are PETRA ("Pointwise Encoding Time reduction with Radial Acquisition"), as is described by Grodzki et al. in "Ultra short Echo Time Imaging using Pointwise Encoding Time reduction with Radial Acquisition (PETRA)", Proc. Intl. Soc. Mag. Reson. Med. 19 (2011) pp. 2815, or z-TE, as described by Weiger et al. in "MRI with zero echo time: hard versus sweep pulse excitation", Magn. Reson. Med. 66 (2011) S. 379-389.

With PETRA or z-TE sequences, the spatial encoding gradients are switched on as early as during the excitation. Excitation pulses with PETRA or z-TE must be non-selective therefore. A slice-selective two-dimensional (2D) measurement is thus not possible with these sequences. Instead, basically the three-dimensional (3D) k-space is isotropically sampled. With UTE sequences, in which, as described above, the imaging gradients are switched on at the same time as the data acquisition after an excitation pulse, slice-selective 2D measurement, and therewith 2D imaging, is possible.

The use of UTE sequences is technically problematic in both 2D as well as 3D measurements, however. The reasons for this are, for example, that eddy currents during powering up of the gradient interfere with the measurement. PETRA and z-TE are much more robust here. Furthermore, encoding times with PETRA and z-TE are shorter than with UTE, whereby PETRA and z-TE are better suited to rapidly decaying signals. In addition, a higher resolution and a better SNR can thus be achieved with PETRA or z-TE than with UTE with an identical acquisition bandwidth. On the other hand, 2D measurements are many times faster than 3D measurements owing to the lower volume of data alone.

A projection method for the PETRA sequence is already known from DE 10 2010 041 446 A1 in which encoding in the z-direction is omitted. In this way, a projection image, in principle similar to an X-ray image, is recorded. In simple terms it could be said that the image has an "infinitely thick" layer, of course limited defacto, for example by the coils used during recording or also the homogeneity volume of the magnetic resonance system used. The projection method approach has the advantage that the required raw data can be recorded very quickly (in a few seconds). However, in this projection method a much stronger signal is measured from the immediate environment of the coils used than from regions located further away, for example deeper, from the coils in the inside of an examination object in which a region that is actually of interest is situated, however, whereby an item of information which is sometimes not sufficient can be obtained for regions situated further from the coils used. This effect of the different sensitivity of the coils in close and remote regions cannot be standardized.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

Figure 1:
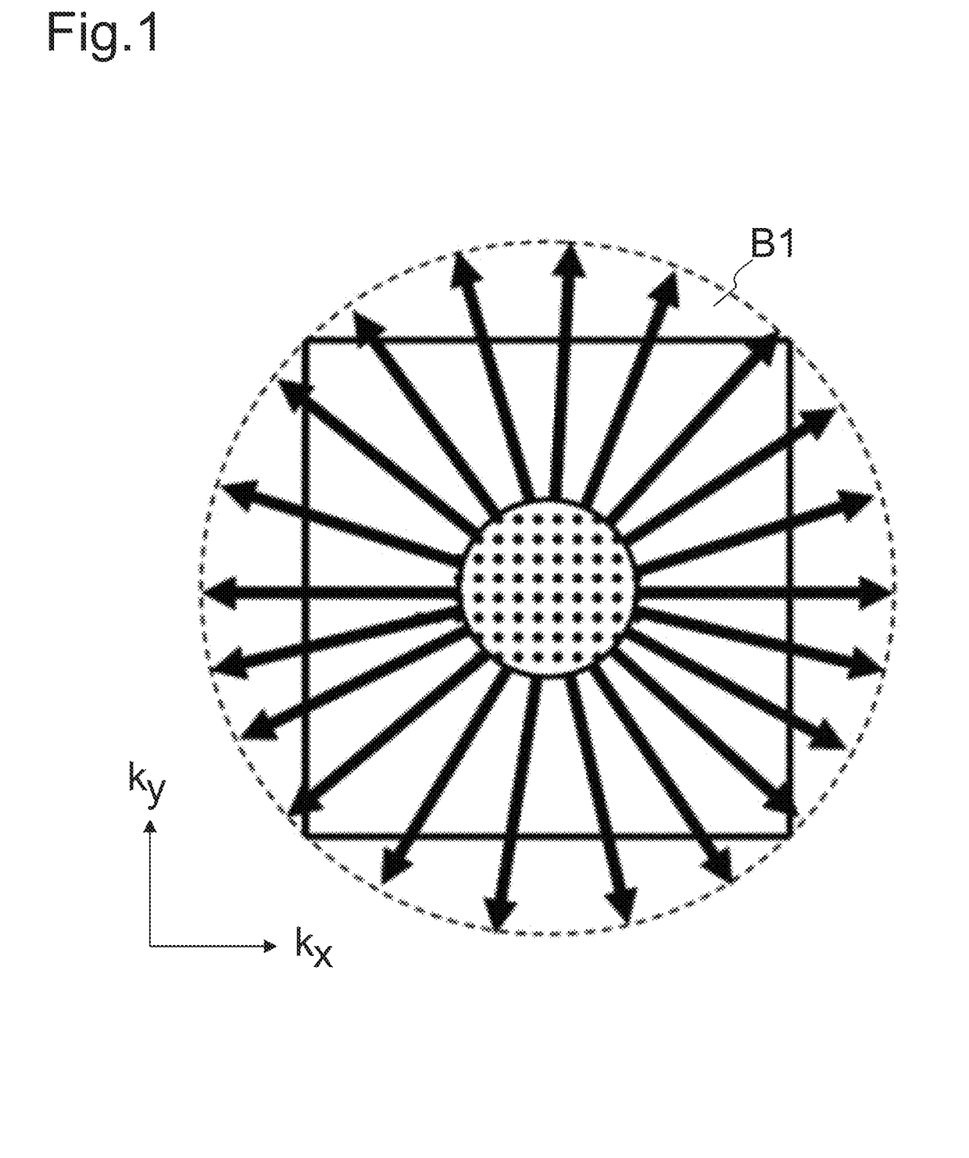
FIG. 1 schematically shows an exemplary sampling pattern, according to which the k-space can be sampled with a PETRA/z-TE sequence.

FIG. 1 schematically shows an exemplary sampling pattern, according to which the k-space is sampled with a PETRA/z-TE sequence. The k-space is shown in the kx-ky plane by way of example in this case. Due to the gradients which are powered up as early as at the beginning of recording of the measurement data, a central region of the k-space, represented here as a circle filled with dots, is not sampled by the radial trajectories predefined by the gradients. The radial trajectories, along whose raw data points recording takes place, cover a region B1, however. The central region can be sampled pointwise, for example, as described, for example, in DE 10 2010 041 446 A1 already cited.

An object of the present disclosure is to create image data of examination objects with ultra short echo times, with the creation being robust and not requiring long measuring times.

The object is achieved by a method for creating an image dataset of a mapping area situated in a measuring volume of a magnetic resonance system by means of a magnetic resonance system according to the disclosure, a magnetic resonance system according to the disclosure, a computer program product according to the disclosure, and an electronically readable medium according to the disclosure.

An inventive method for creating an image dataset of a mapping area situated in a measuring volume of a magnetic resonance system by means of the magnetic resonance system may include the following steps:

reading out a k-space corresponding to the mapping area, wherein reading-out may include the following steps:
  a) switching a gradient in the slice selection direction and a phase-encoding gradient in at least one further encoding direction by means of a gradient unit of the magnetic resonance system,
  b) after reaching the full strength of the gradient switched in the slice selection direction and the full strength of the switched phase-encoding gradient, radiating a non-slice-selective RF excitation pulse by means of a radio frequency unit of the magnetic resonance system,
  c) after radiating the non-slice-selective RF excitation pulse, powering down the gradient switched in the slice selection direction,
  d) after a time t1 after the most recently radiated RF excitation pulse, recording echo signals by means of the radio frequency unit and storing them as raw data points along the radial k-space trajectory predefined by the full strength of the phase-encoding gradient further switched during recording of the echo signals,
  e) repeating steps a) to c) with different phase-encoding gradients until the k-space corresponding to the mapping area in a first region is read out depending on the time t1 along radial k-space trajectories, and
  f) reading out the k-space corresponding to the mapping area, which is not covered by the first region of the k-space, and which may include at least the k-space center, in a manner different to that described by steps a) to e), and storing these raw data points, and
reconstructing image data from the recorded raw data points of the k-space by means of an evaluation apparatus of the magnetic resonance system, wherein the reconstruction may include a Fourier transform.

Encoding in the slice selection direction can be achieved by the inventive switching of gradients in the slice selection direction before recording echo signals. The radial k-space trajectories run in a phase encoding direction perpendicular to the slice selection direction, so image data reconstructed from the raw data shows a projection in the slice selection direction of the mapping area. The method can thus be regarded as a PETRA or z-TE projection method, but which is inventively enhanced by encoding in the slice direction. A mixture between isotropic 3D sampling and a projection measurement is thus made possible.

In one exemplary embodiment, steps a) to f) are repeated with at least one further gradient in the slice selection direction whose full strength differs from the full strength of a gradient in the slice selection direction already switched during radiation of a non-slice-selective RF excitation pulse.

Switching gradients in the slice selection direction with different full strength in conjunction with inventive recording of measurement data as raw data points achieves a partitioning into partitions in the slice selection direction of the raw data recorded in the 3D k-space, the number of which partitions corresponds to the number of different full strengths of the gradients. A 3D image dataset, which also has a resolution in the slice selection direction, can thus be reconstructed with just a few rapidly executable recordings of raw data in phase encoding directions perpendicular to the slice selection direction. The entire recording duration is significantly reduced here compared to a customary isotropic 3D PETRA or z-TE. The partitions can be purposefully limited to regions of interest by the method described herein. Measuring does not have to be performed with infinitely thick layers in which regions of interest are potentially overlaid with interfering signal components, as in the case of a projection method. Although the measuring time is increased compared to a projection method, it is simultaneously much quicker than a 3D isotropic measurement, and supplies the desired items of information without interfering overlays.

An inventive magnetic resonance system may include a magnetic unit, a gradient unit, a radio frequency unit and a control facility, embodied for carrying out an inventive method, with an evaluation apparatus.

An inventive computer program implements an inventive method on a control facility when it is executed on the control facility. For example, the computer program comprises commands, which on execution of the program by a control facility, for example a control facility of a magnetic resonance system, prompt this control facility to carry out an inventive method. The control facility can be designed in the form of a computer.

The computer program can also be in the form of a computer program product here, which can be loaded directly into a memory of a control facility, with program code means in order to carry out an inventive method when the computer program product is executed in a computing unit of the computing system.

An inventive computer-readable storage medium comprises commands, which on execution by a control facility, for example a control facility of a magnetic resonance system, prompt the facility to carry out an inventive method.

The computer-readable storage medium can be embodied as an electronically readable data carrier, which comprises electronically readable items of control information saved thereon, which comprise at least one inventive computer program and are embodied in such a way that they carry out an inventive method when the data carrier is used in a control facility of a magnetic resonance system.

The advantages and statements disclosed in relation to the method analogously apply also to the magnetic resonance system, the computer program product and the electronically readable data carrier.

Figure 2:
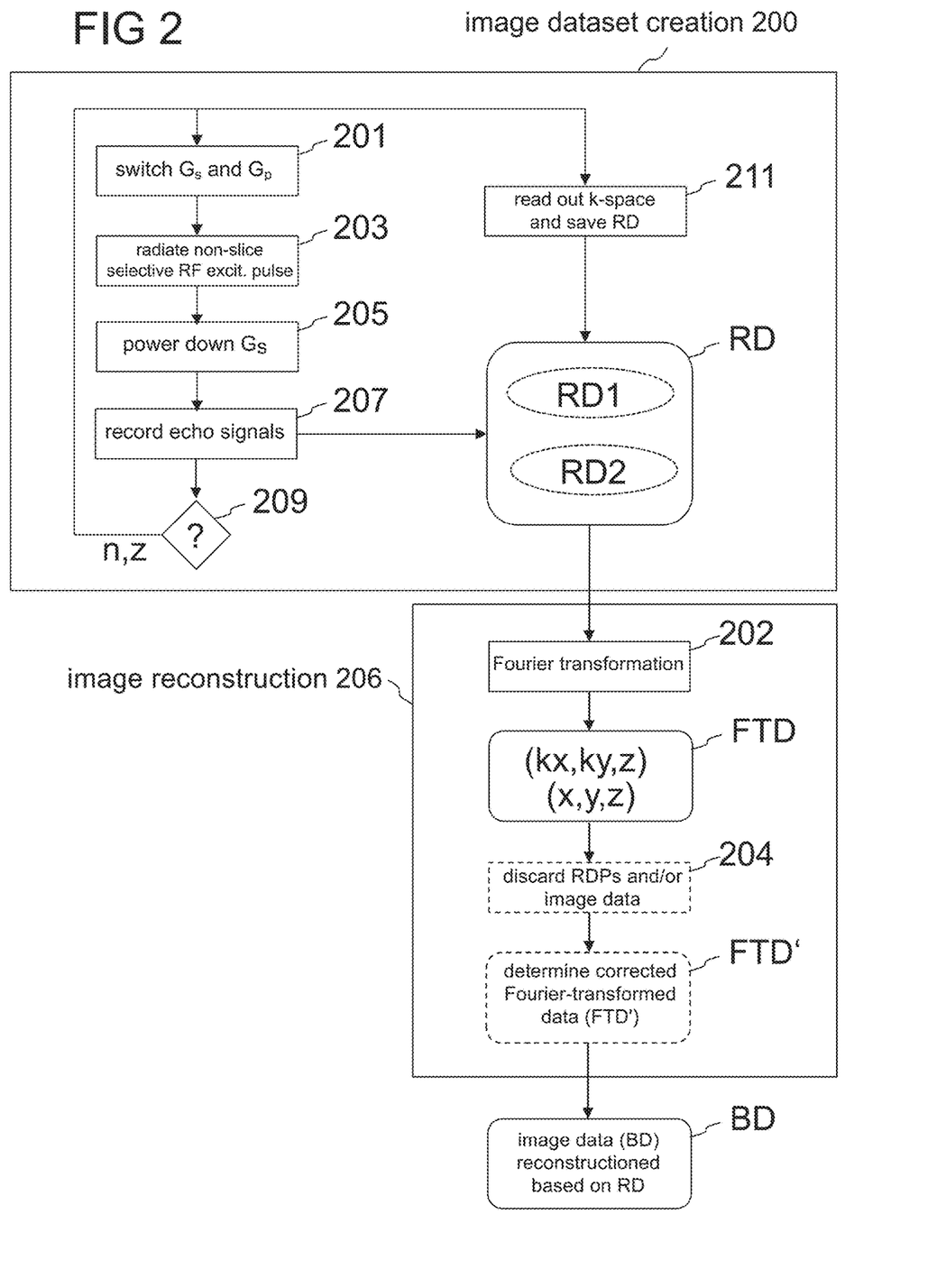
FIG. 2 is a flowchart of a method according to the present disclosure.

FIG. 2 shows a schematic flowchart of an inventive method for creating an image dataset of a mapping area situated in a measuring volume of a magnetic resonance system by means of the magnetic resonance system.

A k-space corresponding to the mapping area is read out here (Block 200) to create an image dataset.

For this, a gradient Gs is switched in the slice selection direction and a phase encoding gradient Gp is switched in at least one further encoding direction by means of a gradient unit of the magnetic resonance system (Block 201). The further encoding directions are perpendicular to the slice selection direction. It should be noted that the slice selection direction and the further encoding directions can basically be arbitrarily selected, but preferably form an orthogonal system.

After reaching the full strength of the gradient Gs switched in the slice selection direction and the full strength of the switched phase-encoding gradient Gp, a non-slice selective RF excitation pulse is radiated by means of a radio frequency unit of the magnetic resonance system (Block 203).

The gradient Gs switched in the slice selection direction is powered down again after radiation of the non-slice-selective RF excitation pulse (Block 205).

After a time t1 after the most recently radiated RF excitation pulse, after which the phase-encoding gradients switched in Block 201 will still have their full strength, echo signals are recorded by means of the radio frequency unit and are saved as raw data points along the radial k-space trajectory predefined by the full strength of the phase-encoding gradient further switched during recording of the echo signals (Block 207). The time t1 can, in particular, be equal to the minimum changeover time between a transmitting mode and a receiving mode of the radio frequency unit, so the shortest possible echo times can be measured.

After the time t1 after the most recently radiated RF excitation pulse, the gradient Gs in the slice selection direction can already be completely powered down, so the gradient Gs in the slice selection direction has a strength of zero at the time t1. In this way, it is possible to ensure that the raw data recorded in blocks 201 to 207 does not receive any portions in the slice selection direction during recording.

The at least one gradient Gs switched in the slice selection direction can be powered down at the maximum slew rate of the magnetic resonance system. In this way, an optimally large moment can be accumulated in the slice selection direction before recording of the measurement data as raw data points.

Once all desired echo signals have been recorded after an RF excitation pulse, and therewith the corresponding k-space trajectory(ies) have been read out, query 209 checks whether the k-space corresponding to the mapping area has thus already been read out or not along radial k-space trajectories in a first region dependent on the time t1. If not all of the desired n radial k-space trajectories have been recorded yet, the process begins again at Block 201, with phase-encoding gradients different from the previously used phase-encoding gradients being switched.

The k-space corresponding to the mapping area and which is not covered by the first region of the k-space, which first region is sampled by means of Blocks 201 to 207, is read out at any instant or also at different instants before, between or after reading out the radial k-space trajectories, for example pointwise by means of a single point imaging method, such as RASP, or in another known way (Block 211) and likewise saved in the raw dataset RD. If the raw data points which contain the k-space center, are captured here in a Cartesian manner, what is known as regridding before the reconstruction of image data is superfluous.

Blocks 201 to 207 can be repeated with at least one further gradient in the slice selection direction whose full strength differs from the full strength of a gradient in the slice selection direction already switched during radiation of a non-slice-selective RF excitation pulse. For this the query 209 can continue to query, for example, whether all desired full strengths of the gradient in the slice selection direction z have already been measured, and if not, begin again at Block 201, but with a gradient in the slice selection direction with a full strength that has not yet been measured. Block 211 can also be repeated in this way for further desired full strengths for the gradient in the slice selection direction until all measurement data with all desired full strengths of gradients in the slice selection direction has also been recorded in the central region which does not correspond to the first region. Blocks 201 to 207 can be carried out with different full strengths for at least three, or even four or more, gradients in the slice selection direction.

Image data BD is reconstructed (Block 206) from the recorded raw data points RD of the k-space by means of an evaluation apparatus of the magnetic resonance system, with the reconstruction comprising a Fourier transform, in particular in the slice selection direction (Block 202), which converts the raw data points RD into Fourier-transformed data FTD. The Fourier-transformed data FTD can thus be present in the spatial domain (x,y,z), for example in a hybrid space (kx,ky,z), after a Fourier transform only in the slice selection direction (without limiting the generality, here, for example, the z-direction), or also, for example after Fourier transform in all three spatial directions.

Image data can be calculated in the slice selection direction for switched gradients in positions corresponding to the slice selection direction by the Fourier transform in the slice selection direction.

Raw data points recorded after the Fourier transform in the slice selection direction, and/or image data reconstructed from the recorded raw data points for particular, especially external, positions in the slice selection direction can be discarded (Block 204), so corrected Fourier-transformed data FTD' reduced by the discarded data is obtained. In this way, it is possible that raw data points recorded with an excessive signal, possibly due to the geometry or other properties of the coils used for recording the measurement data, and or image data reconstructed from such raw data points do not enter the final image data and they thus do not cover items of information from regions not recorded with an excessive signal.

Image data calculated for different switched gradients in the slice selection direction can be merged, for example to form an overall image dataset. Or image data can be reconstructed from the raw data points recorded in the 3D k-space in a manner that is conventional in 3D MR imaging.

Figure 3:
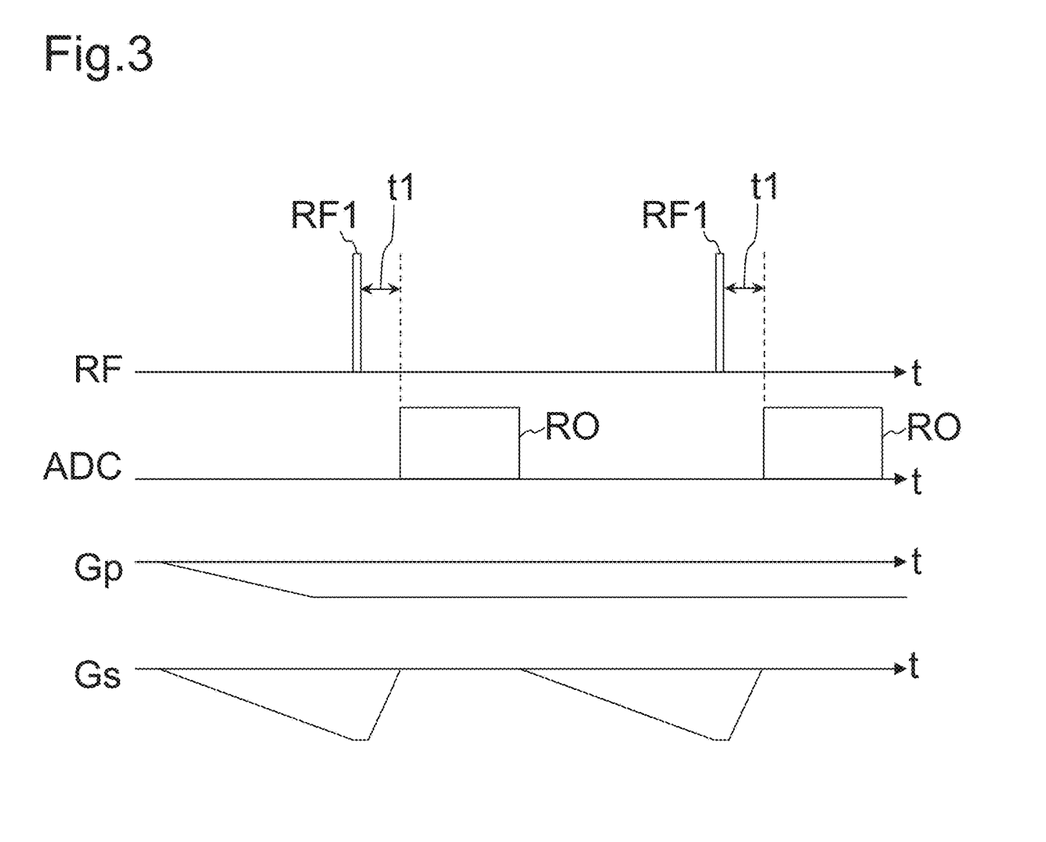
FIG. 3 shows part of a pulse sequence pattern for the capture of raw data on a radial k-space trajectory according to the present disclosure.

FIG. 3 schematically shows part of a pulse sequence pattern for inventive capture of raw data on a radial k-space trajectory. The RF excitation pulses RF1 to be radiated are represented in the top row RF, the recording windows RO, in which measurement data is recorded and which begin a time t1 after a preceding RF excitation pulse RF1, are represented in the second row ADC, phase-encoding gradients to be switched are represented in the third row Gp, and gradients to be switched in the slice selection direction are represented in the bottom row Gs in their temporal relationship.

As can be seen, phase-encoding gradients and gradient in the slice selection direction are powered up to their full strength before an RF excitation pulse RF1 is radiated, and maintain their respective full strength until the RF excitation pulse RF1 is radiated. Phase-encoding gradients are maintained at their full strength even after radiation of an RF excitation pulse RF in order to record measurement data along a radial k-space trajectory corresponding to the respective phase-encoding gradient during the recording window RO. The gradient in the slice selection direction is powered down after an RF excitation pulse RF1, however, so it disappears by the beginning of the following recording window RO. During the expiry of the time t1 after an RF excitation pulse RF1 a gradient moment is built up in the slice selection direction due the powered-down gradient in the slice selection direction, which moment predefines an achievable partition thickness in the slice selection direction.

Encoding of the spins in the mapping area effectively begins in the middle of an RF excitation pulse RF1. If it is approximately assumed that the gradient in the slice selection direction is powered down as of the middle of the RF excitation pulse RF1 in order to be powered down at the beginning of the recording window (with PETRA, for example usually 70 μs) to the value zero again, the moment of the gradient in the slice selection direction in the period between RF excitation pulse RF1 and beginning of the recording window RO (the shortest echo time TE therefore) is given slightly simplified by way of a triangular form by $k=\gamma$ Gs*TE*½.

Even if the ramping down—as preferred—is only started after the end of the RF excitation pulse, the moment consequently hardly changes for the approximation presented here.

Gs is the full strength of the gradient in the slice selection direction as is also present for the middle of the RF excitation pulse. As may be seen, a maximum full strength of the gradient in the slice selection direction, and therewith the maximum possible moment, is determined by how quickly the gradient can be powered down, by $Gs_{,max}$=SR*TE therefore, with the slew rate SR. With a slew rate of the used magnetic resonance system of, for example, 150 mT/m/ms, the maximum full strength of the gradient Gs at a TE of 70 μs would be therefore: $Gs_{,max}$=10.5 mT/m.

The maximum possible k-space encoding in the slice selection direction kMax=+/−½*N/total thickness of the target volume results from this too, where N is equal to the number of different strengths of the gradient in the slice selection direction; and the minimum resolution 1/kMax, minimum partition thickness therefore. In our example the minimum partition thickness is 32 mm.

Figure 4:
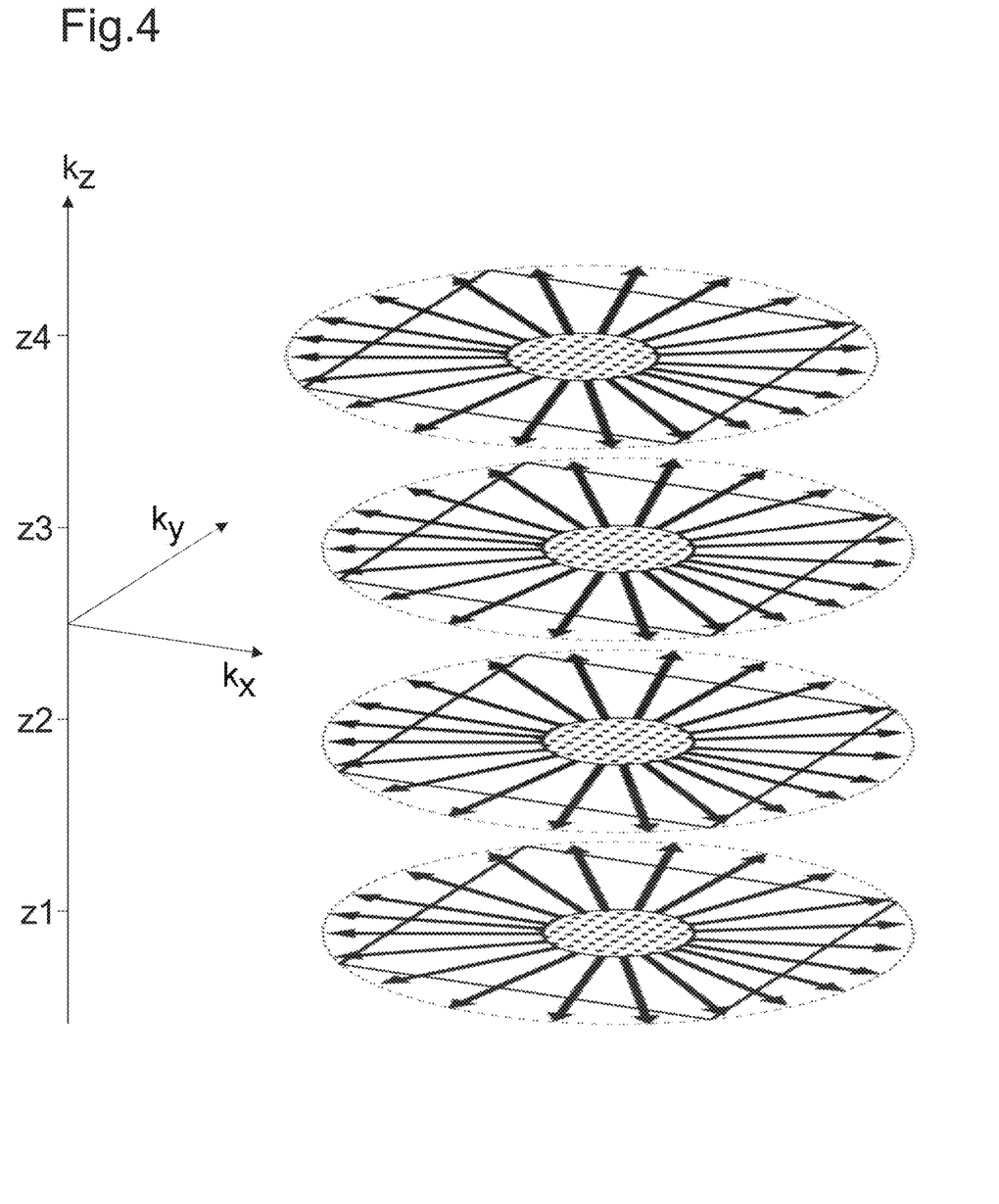
FIG. 4 shows an example sampling pattern, according to which the k-space can be sampled with a method according to the present disclosure.

FIG. 4 schematically shows an exemplary sampling pattern, according to which the k-space can be sampled with an inventive method.

The 3D k-space is sampled here in the kx-ky plane, according to a PETRA projection method, as is also shown in FIG. 1. Virtually one 2D stack each, here a total of four corresponding to the full strengths z1, z2, z3 and z4 of the gradients inventively switched in the slice selection direction, are measured for every different switched gradient in the slice selection direction due to the additional encoding in the slice selection direction (here: kz) by way of the inventive switching of gradients in the slice selection direction. The resolution in the slice selection direction is greatly reduced compared to isotropic 3D sampling, that is to say, a thickness of the partitions is increased in the slice selection direction, in general greater than 2-3 cm (see above). Thus, virtually a plurality of 2D k-spaces is filled, which are merged to form a 3D k-space with few partitions (can optionally also be referred to as thick layers). There is a large number of applications in which thick partitions of this kind are by all means sufficient to obtain the desired items of information from the MR measurement, for example in lung or bone imaging.

Figure 5:
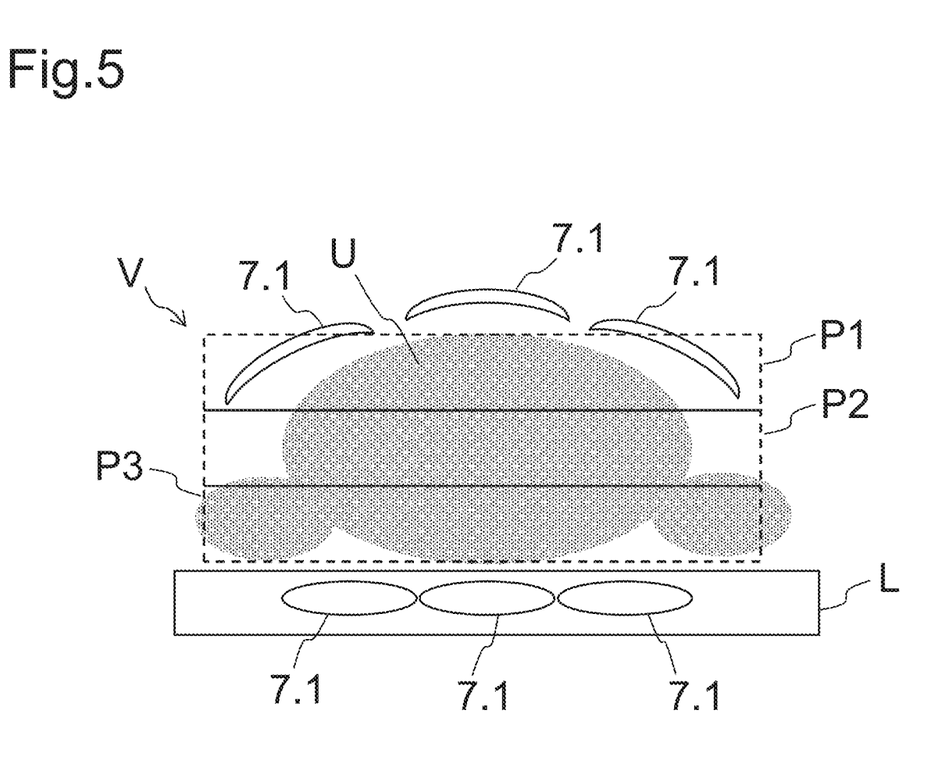
FIG. 5 shows an example of projection partitions according to a method of the present disclosure.

FIG. 5 schematically shows an example of projection partitions according to an inventive method. An examination object U is represented by a dotted region, which object lies on a couch L of a magnetic resonance system, so a mapping region is located in a target volume V. In the example shown, coils 7.1 of a radio frequency unit are arranged both in the couch L as well as on the examination object U. In the example shown, the target volume was divided into three partitions P1, P2, P3 in the slice selection direction, and these correspond to three different full strengths, for example +Gs, 0 and −Gs, of gradients switched in the slice selection direction.

Measuring signals recorded in the partitions P1 and P3 are possibly overlaid with high signals from the immediate environment of the coils due to their proximity to the coils used for recording, and this can result in undesirable excessive increases in signals. The middle partition P2 is sufficiently far removed from the coils that it can be assumed that a largely homogeneous signal is measured in the partition P2. Furthermore, the partition covers the mapping region that is actually of interest.

As described above, with the method presented herein it is possible, for example, to discard the raw data points of the partitions P1 and P3, or image data reconstructed from these raw data points, so raw data measured from the partition P2 with homogeneous signal or image data reconstructed from this remains, which shows the mapping region of interest.

Compared to a PETRA or z-TE projection method which is already known, the measuring time is indeed lengthened by a factor, which corresponds to the number of desired different full strengths of the gradients to be switched in the slice selection direction (in the example of FIG. 5, by the factor 3 therefore, since three partitions). Since a single measurement with such a projection method lasts only a few seconds, however, primarily compared to isotropic sampling of the k-space, the overall measuring time is always still short enough to be very suitable, for example also in the context of breath-holding recording, during which a breathing examination object has to hold their breath for the duration of the recording.

Figure 6:
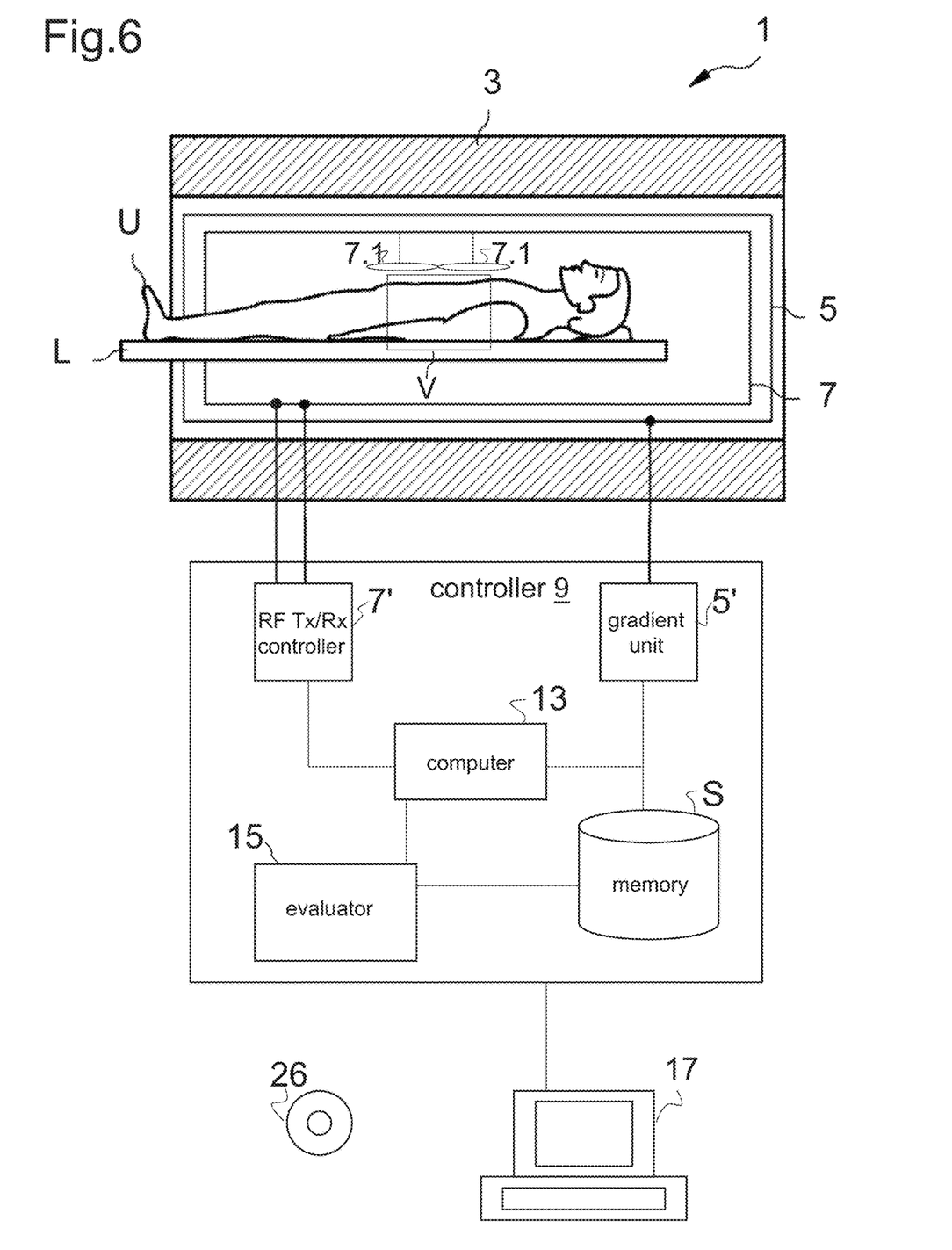
FIG. 6 shows a magnetic resonance system according to the present disclosure.

FIG. 6 schematically represents an inventive magnetic resonance system 1. The magnetic resonance system 1 may include a magnetic unit 3 for generating the basic magnetic field, a gradient unit 5 for generating the gradient fields, a radio frequency unit 7 for radiating and for receiving radio frequency signals and a control facility (controller) 9 configured to perform the method according to the disclosure and/or to control the magnetic resonance system 1. The magnetic unit 3, gradient unit 5, and radio frequency unit 7 may collectively be referred to as a magnetic resonance scanner.

To further reduce the total required measuring time the method described herein can also be combined with further acceleration techniques known per se, in particular, for example, with Compressed Sensing, in which less measurement data has to be recorded than specified by Nyquist's theorem, but which is supplemented by supplementation techniques, as a rule before image reconstruction.

FIG. 6 schematically represents, only roughly, these partial units of the magnetic resonance system 1. In particular, the radio frequency unit 7 can be composed of a plurality of sub-units, for example of a plurality of coils like the schematically shown coils 7.1 or more coils, which can be configured to transmit radio frequency signals, receive the triggered radio frequency signals, or for both.

In order to examine an examination object U, for example a patient or also a phantom, the object can be introduced into the magnetic resonance system 1, in the measuring volume thereof, on a couch L. Coils (not represented) of the radio frequency unit 7 can also be integrated in the couch L. The volume V represents an exemplary target volume of the examination object from which echo signals are recorded as raw data points and captured as measurement data.

The control facility (controller) 9 may be configured to control the magnetic resonance system 1 and to control, in particular, the gradient unit 5 using a gradient controller 5' and the radio frequency unit 7 using a radio-frequency transmitting/receiving controller 7'. The radio frequency unit 7 can comprise a plurality of channels here on which signals can be transmitted or received. In an exemplary embodiment, the controller 9 includes processing circuitry that is configured to perform one or more operations of the controller 9. Additionally, or alternatively, one or more components of the controller 9 includes processing circuitry that is configured to perform one or more respective functions of the component(s).

The radio frequency unit 7, together with its radio-frequency transmitting/receiving controller 7', is responsible for generating and radiating (transmitting) a radio-frequency alternating field for manipulating the spins in a region to be manipulated (for example in slices S to be measured) of the examination object U. As a rule, the center frequency of the radio-frequency alternating field, also referred to as the B1 field, is optimally adjusted such that it lies close to the resonance frequency of the spins to be manipulated. Deviations of the center frequency from the resonance frequency are referred to as off-resonance. Controlled currents are applied to the RF coils for generating the B1 field in the radio frequency unit 7 by means of the radio-frequency transmitting/receiving controller 7'.

Furthermore, the control facility 9 comprises an evaluation apparatus (evaluator) 15 with which image data can be reconstructed from inventively read-out raw data points. The control facility 9 may be configured as a whole to carry out an inventive method.

A computing unit (computer) 13 incorporated by the control facility 9 is configured to carry out all computing operations necessary for the required measurements and determinations. The computer 13 may include one or more processors, for example. Intermediate results and results required for this or ascertained here can be saved in a memory unit S of the control facility 9. The represented units are not necessarily to be taken to mean physically separate units here. Instead, they merely represent a subdivision into expedient units, but which can also be implemented, for example, in fewer units or also in just a single physical unit.

Control commands can be conveyed to the magnetic resonance system via an input/output (I/O) interface 17 of the magnetic resonance system 1, for example by a user, and/or results of the control facility 9, such as image data, can be displayed and/or stored.

A method described herein can also be in the form of a computer program which comprises commands, which carry out the described method on a control facility 9. Similarly, a computer-readable storage medium 26 can be present which comprises commands, which on execution by a control facility 9 of a magnetic resonance system 1 prompt it to carry out the described method.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A method for creating an image dataset of a mapping area situated in a measuring volume of a magnetic resonance (MR) system using the MR system, the method comprising:
   reading out a k-space corresponding to the mapping area, the reading-out of k-space including:
   a) switching a gradient (Gs) in the slice selection direction and a phase-encoding gradient (Gp) in at least one further encoding direction by a gradient unit of the MR system,
   b) after reaching a full strength of the gradient (Gs) switched in the slice selection direction and a full strength of the switched phase-encoding gradient (Gp), radiating a non-slice-selective radio-frequency (RF) excitation pulse (RF1) by a RF unit of the MR system,
   c) after radiating the non-slice-selective RF excitation pulse (RF1), powering down the gradient (Gs) switched in the slice selection direction,
   d) after a time t1 after the most recently radiated RF excitation pulse (RF1), recording echo signals by the RF unit and storing the recorded echo signals as first raw data points (RD1) along a radial k-space trajectory predefined by the full strength of the phase-encoding gradients (Gp) further switched during recording of the echo signals, e) repeating steps a) to c) with different phase-encoding gradients (Gp) until k-space corresponding to the mapping area in a first region (B1) is read out depending on the time t1 along radial k-space trajectories, and f) reading out k-space corresponding to the mapping area, which is not covered by the first region (B1) of k-space, and which comprises at least a k-space center, in a manner different to that of steps a) to e), and storing the read-out k-space corresponding to the mapping area as second raw data points (RD2), reconstructing, by evaluator of the MR system, image data (BD) based on the recorded first and second raw data points of k-space.

2. The method as claimed in claim 1, wherein the reconstruction comprises a Fourier transform.

3. The method as claimed in claim 1, wherein operations a) to f) are repeated with at least one further gradient (Gs) in the slice selection direction whose full strength differs from the full strength of a gradient (Gs) already switched during radiation of a non-slice-selective RF excitation pulse in the slice selection direction.

4. The method as claimed in claim 3, wherein the reconstruction of image data (BD) from the recorded first and second raw data points of k-space comprises a Fourier transform in the slice selection direction.

5. The method as claimed in claim 4, wherein, after the Fourier transform in the slice selection direction, discarding, for positions in the slice selection direction:

recorded raw data points of the recorded first raw data points and/or of the recorded second raw data points; and/or image data reconstructed from the recorded first and second raw data points.

6. The method as claimed in claim 5, wherein the positions in the slice selection direction are external positions in the slice selection direction.

7. The method as claimed in claim 3, wherein image data for positions corresponding to switched gradients (Gs) in the slice selection direction is calculated in the slice selection direction.

8. The method as claimed in claim 7, further comprising merging image data calculated for different switched gradients (Gs) in the slice selection direction to form an overall image dataset.

9. The method as claimed in claim 1, wherein the gradient (Gs) in the slice selection direction is completely powered down after the time t1 after the most recently radiated RF excitation pulse.

10. The method as claimed in claim 1, wherein powering down of at least one gradient switched in the slice selection direction takes place with maximum slew rate of the MR system.

11. The method as claimed in claim 1, wherein the second raw data points (RD2) are read out in operation f) as Cartesian raw data points.

12. The method as claimed in claim 1, wherein the second raw data points (RD2) are read out in operation f) using a single point imaging method.

13. The method as claimed in claim 1, wherein the time t1 is equal to a minimum changeover time between a transmitting mode and a receiving mode of the radio frequency unit of the MR system.

14. A non-transitory computer-readable storage medium storing instructions that, when executed by one or more processors, cause the one or more processors to perform the operations of the method of claim 1.

15. A magnetic resonance (MR) system comprising:
one or more processors; and
memory storing instructions that, when executed by the one or more processors, cause the MR system to perform the method of claim 1.

16. A magnetic resonance (MR) system comprising:
a scanner; and
a controller configured to:
control the scanner to read out a k-space corresponding to the mapping area, the reading-out of k-space including:

a) switching a gradient (Gs) in the slice selection direction and a phase-encoding gradient (Gp) in at least one further encoding direction, b) after reaching a full strength of the gradient (Gs) switched in the slice selection direction and a full strength of the switched phase-encoding gradient (Gp), radiating a non-slice-selective radio-frequency (RF) excitation pulse (RF1), c) after radiating the non-slice-selective RF excitation pulse (RF1), powering down the gradient (Gs) switched in the slice selection direction, d) after a time t1 after the most recently radiated RF excitation pulse (RF1), recording echo signals, wherein the controller is configured to store the recorded echo signals as first raw data points (RD1) along a radial k-space trajectory predefined by the full strength of the phase-encoding gradients (Gp) further switched during recording of the echo signals, e) repeating steps a) to c) with different phase-encoding gradients (Gp) until k-space corresponding to the mapping area in a first region (B1) is read out depending on the time t1 along radial k-space trajectories, and f) reading out k-space corresponding to the mapping area, which is not covered by the first region (B1) of k-space, and which comprises at least a k-space center, in a manner different to that of steps a) to e), wherein the controller is configured to store the read-out k-space corresponding to the mapping area as second raw data points (RD2), reconstruct image data (BD) based on the recorded first and second raw data points of k-space.

17. The MR system according to claim 16, wherein the scanner comprises a magnetic unit, a gradient unit, and a radio frequency unit.

18. The MR system according to claim 16, wherein the controller comprises a radio-frequency transmitting/receiving controller and an evaluator.

* * * * *